United States Patent
Banga et al.

(10) Patent No.: US 7,426,576 B1
(45) Date of Patent: Sep. 16, 2008

(54) HIGHLY AVAILABLE DNS RESOLVER AND METHOD FOR USE OF THE SAME

(75) Inventors: Gaurav Banga, Sunnyvale, CA (US); James Stewart, Palo Alto, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 706 days.

(21) Appl. No.: 10/251,298

(22) Filed: Sep. 20, 2002

(51) Int. Cl.
*G06F 15/16* (2006.01)

(52) U.S. Cl. ............................. 709/245; 709/226; 707/3

(58) Field of Classification Search ................. 709/224, 709/328, 245, 226, 230, 239, 206, 219; 718/105; 370/338; 707/3
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A | 5/2000 | Hitz et al. | |
| 6,138,126 A | 10/2000 | Hitz et al. | |
| 6,289,356 B1 | 9/2001 | Hitz et al. | |
| 6,425,035 B2 | 7/2002 | Hoese et al. | |
| 6,446,133 B1 * | 9/2002 | Tan et al. | 709/245 |
| 6,647,427 B1 * | 11/2003 | Watanabe | 709/239 |
| 6,826,611 B1 * | 11/2004 | Arndt | 709/226 |
| 6,834,302 B1 * | 12/2004 | Harvell | 709/224 |
| 6,871,347 B2 * | 3/2005 | Hay | 718/105 |
| 7,000,016 B1 * | 2/2006 | Vanderbeck et al. | 709/226 |
| 2001/0023447 A1 * | 9/2001 | West et al. | 709/230 |

(Continued)

OTHER PUBLICATIONS

David Hitz et al. TR3002 File System Design for a NFS File Server Appliance published by Network Appliance, Inc.

(Continued)

*Primary Examiner*—Jungwon Chang
(74) *Attorney, Agent, or Firm*—Cesari and McKenna, LLP

(57) ABSTRACT

The present invention relates to an enhanced DNS resolver architecture configured to operate in high availability environments, such as the Internet. Specifically, the DNS resolver code of the present invention may be implemented by a storage operating system in a filer. The resolver code modifies a conventional resolver algorithm so as to reduce the time necessary to map IP addresses to alphanumeric domain names and vice versa. Advantageously, the enhanced resolver code keeps track of non-responsive or "dead" DNS servers as well as non-resolvable or "bad" domain names and IP addresses.

15 Claims, 12 Drawing Sheets

U.S. PATENT DOCUMENTS

| | | | |
|---|---|---|---|
| 2002/0002636 A1* | 1/2002 | Vange et al. | 709/328 |
| 2002/0073233 A1* | 6/2002 | Gross et al. | 709/245 |
| 2002/0145992 A1* | 10/2002 | Holt | 370/338 |
| 2002/0184390 A1* | 12/2002 | Alkhatib | 709/245 |
| 2002/0188757 A1* | 12/2002 | Yoon et al. | 709/245 |
| 2003/0172183 A1* | 9/2003 | Anderson et al. | 709/245 |
| 2004/0024872 A1* | 2/2004 | Kelley et al. | 709/225 |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

* cited by examiner

DNS CONFIGURATION 700

| | | | | |
|---|---|---|---|---|
| 710 → DOMAIN | ENG.NETAPP.COM | | | |
| 720 → NAMESERVER | 10.1.1.4 | DEAD | 7.4 | 1.2 |
| 730 → NAMESERVER | 10.1.2.6 | DEAD | 9.2 | 2.0 |
| 740 → NAMESERVER | 128.42.1.30 | ALIVE | 1.1 | 0.3 |
| 750 → NAMESERVER | 100.2.3.4 | ALIVE | 0.7 | 0.3 |
| IDENTIFIER | NETWORK ADDRESS | DEAD/ALIVE STATUS | AVG RTT | RTT VARIANCE |

FIG. 7

HIGHLY AVAILABLE DNS RESOLVER AND METHOD FOR USE OF THE SAME

FIELD OF THE INVENTION

The present invention relates to Domain Name Service (DNS) resolvers and, more specifically to an efficient technique for resolving DNS network addresses.

BACKGROUND INFORMATION

A file server is a computer that provides file service relating to the organization of information on storage devices, such as disks. The file server or filer may be embodied on a storage system including a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored.

As used herein, the term storage operating system generally refers to the computer-executable code operable on a storage system that manages data access requests and may implement file system semantics in implementations involving filers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating over a general-purpose operating system, such as UNIX® or Windows NT®, or as a general-purpose operating system with configurable functionality.

A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages, usually in the form of packets, to the filer over the network.

Broadly stated, clients and servers in a networked environment are assigned unique "addresses" within the network. Therefore, a packet of information communicated within a network can identify a source address and one or more destination addresses. The source address identifies the originator of a packet and the destination addresses identify intended recipients, e.g. file servers. Network addresses can be represented as alphanumeric computer names (such as URLs), numeric addresses, or both. Further, a client or server may be identified by more than one unique address within a single network or among a plurality of networks. Networks are usually associated with a naming service, e.g. the Network Information System (NIS) for UNIX-based networks and the Windows Internet Naming Service (WINS) for Windows®-based networks, that maps network addresses of different types (i.e., numeric and alphanumeric) for clients and servers. The process of converting one network address to an equivalent network address is referred to as name resolution. As used herein, name servers, domain servers and domain name servers will be used synonymously for those servers that perform name resolutions within a naming service.

The Domain Name Service (DNS) is the core naming service in the Internet. Almost all network communication between computers on the Internet use the Internet Protocol (IP) to specify the format of communicated packets or datagrams. The Internet Protocol uses numeric source and destination addresses known as IP addresses. Thus, the DNS typically maps alphanumeric computer names to numeric IP addresses so packets can be properly routed to their destination addresses. In intranets where filers are usually deployed, the DNS may be used to provide a naming service in conjunction with other naming services, such as NIS and WINS.

Usually communication to a filer is "client-initiated," i.e., a client communication system initiates a request for some service and sends it to the filer. Subsequently, the filer responds to the client. However, the filer may authenticate a received request before responding. That is, the filer may match the source address in a received packet against an authentication database, which usually contains client system capability descriptions with clients identified by their alphanumeric names, to decide whether or not the client making the request has requisite permissions to be served. Therefore, the DNS (or NIS or WINS) on the filer side is not only used to resolve alphanumeric names to IP addresses when routing a datagram, but also to reverse-resolve IP addresses to symbolic alphanumeric names when authenticating client requests.

The DNS is implemented by code stored on the filer which, in this case, is functioning as a DNS client and corresponding code stored on a group of one or more DNS servers. As used herein, the code used to implement DNS on a client is called the DNS resolver code or resolver. In response to a request for "name to IP" or "IP to name" resolution, the resolver sends the request to a DNS server which may have the concerned mapping in its own database or may need to communicate with another DNS server to obtain the mapping. When the mapping is available, it is returned to the resolver code on the DNS client.

To expedite "name to IP" and "IP to name" resolutions, some DNS resolver implementations use a cache of DNS mappings stored locally or in an associated proxy cache server used to link the DNS client with a network. A proxy cache server ("proxy") may be used to accelerate client access to the network ("forward proxy") or to accelerate network access to the DNS client ("reverse proxy"). When resolving a name or an IP address, the resolver first attempts to resolve a request using mappings in its DNS cache. Cache entries are typically tagged with a validity time and outdated mappings are periodically deleted in accordance with a conventional aging algorithm.

DNS domain names are usually hierarchical and, consequently, DNS servers are often organized hierarchically. For example, a typical DNS name is:

www.eng.sunnyvale.netapp.com

Here, "www" is the machine name. A first DNS server may be configured with all names that end in engsunnyvale.netapp.com (i.e., all machines of a NetApp engineering organization based in Sunnyvale). This server may not be configured with names in other domains such as marketing.sunnyvale.netapp.com which are stored in a second DNS server. A third DNS server may be configured with all subdomain servers in sunnyvale.netapp.com and can forward requests between the engineering and marketing Sunnyvale DNS servers. Furthermore, the sunnyvale.netapp.com DNS server may not be configured with addresses in the boston.netapp.com domain.

Those mappings are provided by yet another DNS server such that a netapp.com DNS server can forward requests between the Sunnyvale and Boston NetApp servers. Finally, names outside NetApp may be resolved by "top-level" (root) DNS servers.

In general, each DNS client stores its own DNS configuration for use by its resolver. A DNS configuration typically comprises an ordered list of IP addresses for "known" DNS servers, an ordered list of alphanumeric suffixes to be appended to non fully-qualified names and the domain in which the DNS client resides. The list of known servers in the DNS configuration indicates the order in which the resolver contacts DNS servers whose network addresses are known. The list of alphanumeric suffixes in the DNS configuration indicates the order in which the resolver appends suffixes to non fully-qualified names. As used herein, a fully-qualified DNS name ends with a "dot" and does not require additional suffixes in order to be resolved, where a suffix is expressly understood to be a trailing portion of a network address. For example, www.netapp.com. is a fully-qualified name, as indicated by its trailing dot, and a resolver would contact one or more DNS servers to resolve the name exactly as it is written. However, eng.netapp is a non fully-qualified name, and one or more additional suffixes would have to be appended by a resolver attempting to resolve its intended domain name.

Illustratively, the following DNS configuration could be stored in a DNS client, such as a filer, located in the eng.netapp.com domain:

domain eng.netapp.com
search eng.netapp.com, lab.netapp.com, netapp.com
nameserver 10.1.1.4
nameserver 10.1.2.6
nameserver 128.42.1.30

In this example, if the resolver is asked to resolve a fully-qualified domain name such as foo.netapp.com. (notice the "." at the end of the name), it first contacts the DNS server at 10.1.1.4 for the IP address of foo.netapp.com. If no response is received from 10.1.1.4, the resolver eventually "timeouts" and sends a request to the second DNS server at 10.1.2.6 to resolve the name foo.netapp.com. If this server does not respond, the resolver eventually moves on to the third DNS server 128.42.1.30. Reverse resolutions from IP addresses to names are handled in a similar fashion.

In a situation where the resolver is asked to resolve a non-fully qualified name, such as foo or foo.eng, it sequentially appends the suffixes listed in its DNS configuration and tries to resolve the resulting names until one succeeds. For example, if foo.eng is the non fully-qualified name the resolver attempts to resolve, the resolver tries resolving foo.eng.eng.netapp.com, foo.eng.lab.netapp.com and foo.eng.netapp.com, in that order, until a resolution succeeds.

In summary, DNS clients comprise resolver code used to query one or more DNS servers when mapping an alphanumeric domain name to an IP address or vice versa. In some cases, the DNS client may be a filer seeking to authenticate a received data access request or a filer seeking to route data packets to other nodes in a network. Conventionally, the resolver code on a DNS client utilizes a configuration file to systematically resolve a "name to IP" or an "IP to name" request. For fully-qualified name resolution, the DNS configuration file typically includes an ordered list of DNS server addresses to contact. For non fully-qualified name resolution, the configuration file typically includes an ordered list of "trailing" suffixes that can be sequentially appended to the ends of non fully-qualified names being resolved.

The conventional DNS resolver implementation described suffers a number of problems when one or more DNS servers become inaccessible or "dead" to DNS clients. As used herein, a server is dead when it is inaccessible to clients attempting to access its services. A single domain name server could become inaccessible to DNS clients for any number of reasons, e.g., a system crash, a power outage, maintenance outage, etc. Worse yet, multiple servers could become inaccessible, e.g., if there is an outage in a poorly configured network. A conventional resolver typically does not record which servers are "alive" and which are "dead;" therefore, a typical DNS client will continue to contact dead servers even after those servers were previously identified as non-responsive. For instance, a conventional DNS resolver code will attempt to contact servers in the order they are listed in its DNS configuration even when it is known one or more of the servers listed are dead. The DNS servers are contacted in order, always starting with the first server in its DNS configuration, with each server given a predetermined waiting time to respond.

Furthermore, the sequential manner in which a conventional resolver attempts to contact servers in its DNS configuration can be unnecessarily time consuming even when no servers are dead. Sometimes, the DNS is designed so each DNS server can resolve only a sub-group of all possible network addresses. In such situations, the conventional resolver may require a failure from one or more servers listed earlier in its DNS configuration order before it contacts a server capable of performing a desired name resolution.

Disadvantageously, the conventional resolver implementation also does not record unresolvable or "bad" network addresses. As used herein, a network address, e.g. IP address or alphanumeric domain name, is bad when it cannot be resolved by a DNS client or server. Thus, a conventional DNS resolver continues attempting to resolve addresses that previously could not be resolved, thereby consuming time and resources that could be used for other name resolutions.

Additionally, the conventional resolver implementation suffers the disadvantage of not being able to identify fully-qualified names that do not end with a "dot." In many cases when a fully-qualified DNS name is intended to be resolved, the trailing period used to indicate the name is fully-qualified is missing. Network administrators and users are often not aware of the trailing dot syntax, and DNS names intended to be fully-qualified are frequently specified without a trailing dot. Depending on its DNS configuration order, a conventional resolver may potentially have to test a full series of suffix resolutions before finally resolving the intended fully-qualified name. Thus, a conventional resolver may needlessly append suffixes and increase the time required to perform an address resolution.

The aforementioned problems with the conventional resolver implementation become amplified when DNS clients, such as filers, require authentication of a large number of source addresses in a short period of time. File servers often rely on the DNS for authentication purposes, and authentication in many file system protocols (e.g., NFS and CIFS) occurs at a session establishment time. Therefore, when an abnormal network event necessitates the establishment of a large number of new sessions in a short time period, e.g., due to power outages, failovers to backup servers, etc., the numerous resulting authentications may be delayed by the above-noted problems with the conventional resolver architecture. After such abnormal network events, DNS clients often have to rebuild their authentication databases by contacting an appropriate server. Thus, inefficiencies in conventional resolver techniques may "storm" DNS servers with requests at times when the servers are most likely to be unreachable or overwhelmed, e.g., processing requests to rebuild clients' authentication databases.

Previous methods have decreased the latency of resolving network addresses using a conventional DNS resolver. Traditionally, large amounts of DNS cache are used to minimize a resolver's reliance on external DNS servers and allow for quick name resolutions. Other methods rely on designing redundancy into a network of DNS servers so the failure of a small number of servers does not cause excessive delays for individual DNS resolvers. However, the previous methods do not alleviate latencies due to the large timeout values and sequential nature inherent to the conventional resolver algorithm previously described, nor do they do anything about quick resolution of improperly specified fully-qualified DNS names.

SUMMARY OF THE INVENTION

The present invention relates to an enhanced DNS resolver architecture configured to operate in high availability environments, such as the Internet. Specifically, the DNS resolver code of the present invention may be implemented by a storage operating system in a filer. The resolver code modifies the conventional resolver algorithm so as to reduce the time necessary to map IP addresses to alphanumeric domain names and vice versa. Advantageously, the enhanced resolver code keeps track of non-responsive or "dead" DNS servers as well as non-resolvable or "bad" domain names and IP addresses.

In one aspect of the invention, the resolver code periodically sends a "dummy" resolution request to each known DNS server to determine whether the server is accessible or non-accessible. The dummy requests are used to test the responsiveness of DNS servers and do not necessarily comprise domain names or IP addresses to be resolved. During this polling process, DNS servers are marked as "dead" or "alive" based on whether a response to the dummy request is received within a predetermined time interval. In the case where all DNS servers are marked as dead, the resolver relies on a DNS cache to complete resolutions and periodically contacts all known DNS servers in parallel to see if any has become alive again.

In another aspect of the present invention, the DNS resolver does not sequentially send requests to DNS servers it has determined are "dead." Instead, the resolver receives a request for a domain name or IP address and forwards the request to a first DNS server marked as "alive." In addition, the resolver sends the same request in parallel to all servers marked as "dead" that precede the first server in a DNS configuration order. Therefore, in contrast to previous DNS resolvers, the present invention does not have to wait for responses from DNS servers previously determined to be inaccessible before sending a request to a server previously determined to be accessible.

In an illustrative embodiment, the DNS resolver of the present invention optimizes "suffix handling" when resolving domain names and IP addresses. Firstly, when the resolver receives a request to resolve a non fully-qualified domain name having a trailing substring equal to the domain name provided in its DNS configuration, the request is resolved as a fully-qualified domain name. Therefore, non-fully qualified domain names intended to be fully-qualified names are resolved in one step, instead of following the multi-step suffix resolutions of the conventional resolver. This can speed name resolutions substantially, e.g. by a factor of 4 or more.

Secondly, according to another aspect of the present invention, the resolver keeps tables of suffixes that previously resulted in failed name resolutions. For each name resolution that fails all known DNS servers, the trailing substring is stored in a table of "known bad trailers." An advantage of this aspect of the invention is that the resolver does not attempt to resolve a suffix that matches an entry in the "known bad trailers" table. Periodically, the enhanced resolver can revalidate the "badness" of a trailer by sending a resolution request for the bad trailer to all known DNS servers in parallel.

Similarly, for each suffix that failed resolution by at least one DNS server before eventually being resolved, the trailing substring is stored in a table of "known partially good trailers." When a suffix matches an entry in the "known partially good trailers" table, a request is sent to all DNS servers that previously failed its name resolution, and an additional request is sent in parallel to the server that previously succeeded in resolution of the suffix. Each DNS server that fails again is excluded from the next resolution of a name with this suffix. Periodically, the resolver may remove entries from the "known partially good trailers" table under the assumption that they once again are "good."

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 7 is a schematic block diagram illustrating a portion of an exemplary DNS configuration that may be used by a resolver of the present invention;

DETAILED DESCRIPTION OF AN ILLUSTRATIVE EMBODIMENT

A. Storage System Environment

Figure 1:
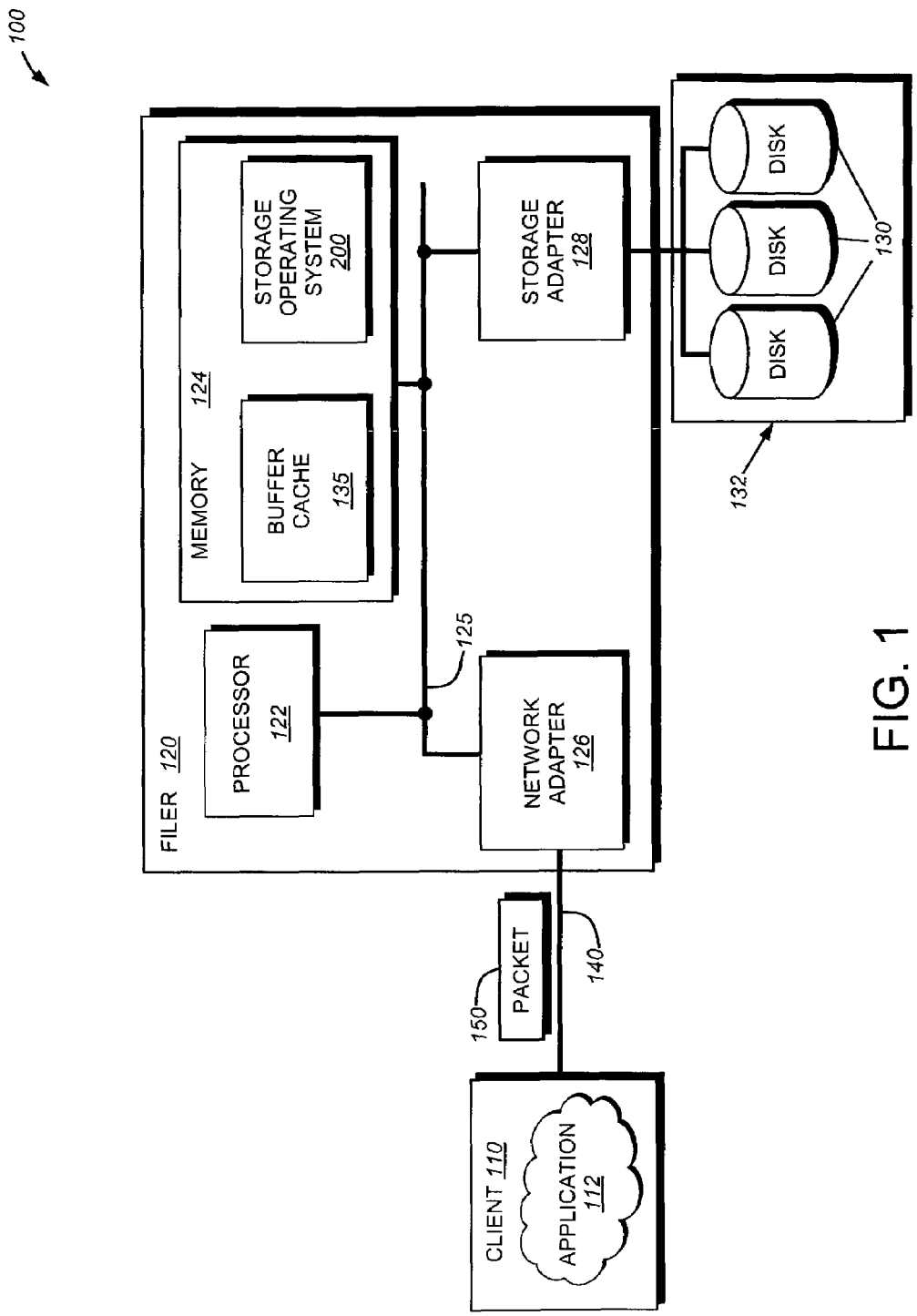
FIG. 1 is a schematic block diagram illustrating a storage system environment including a file server.

FIG. 1 is a schematic block diagram of a storage system environment 100 that includes a client 110 having one or more applications 112, and an interconnected file server 120 that may be advantageously used with the present invention. The filer server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 124 comprises storage locations for data and processor instructions that are addressable by the processor 122 and adapters 126 and 128. The processor and adapters may, in turn, comprise additional processing elements, memory and/or logic circuitry configured to execute software code and manipulate data structures. A portion of the memory may be further organized as a "buffer cache" 135 for storing mappings of alphanumeric network addresses (e.g., Uniform Resource Locators) to numeric addresses (e.g., IP addresses) and vice versa. The operating system 200, portions of which are typically resident in memory and executed by the processing elements, functionally organizes the filer by, inter alia, invoking storage operations in support of a file service implemented by the filer. It will be apparent to those skilled in the art that other processing and memory means may be used for storing and executing program instructions pertaining to the inventive technique described herein. For example, memory 124 may comprise any combination of volatile and non-volatile computer readable media, and processor 122 may offload some processing to other specialized processors that may or may not be resident within filer 120.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a file system protocol. Moreover, the client 110 may interact with the filer 120 in accordance with a client/server model of information delivery. That is, the client may request the services of the filer, and the filer may return the results of the services requested by the client, by exchanging packets 150 encapsulating, e.g., the Common Internet File System (CIFS) protocol or Network File System (NFS) protocol format over the network 140.

The storage adapter 128 cooperates with the operating system 200 executing on the filer to access information requested by the client. The information may be stored on the disks 130 of a disk shelf 132 that is attached, via the storage adapter 128, to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

B. Storage Operating System

As used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
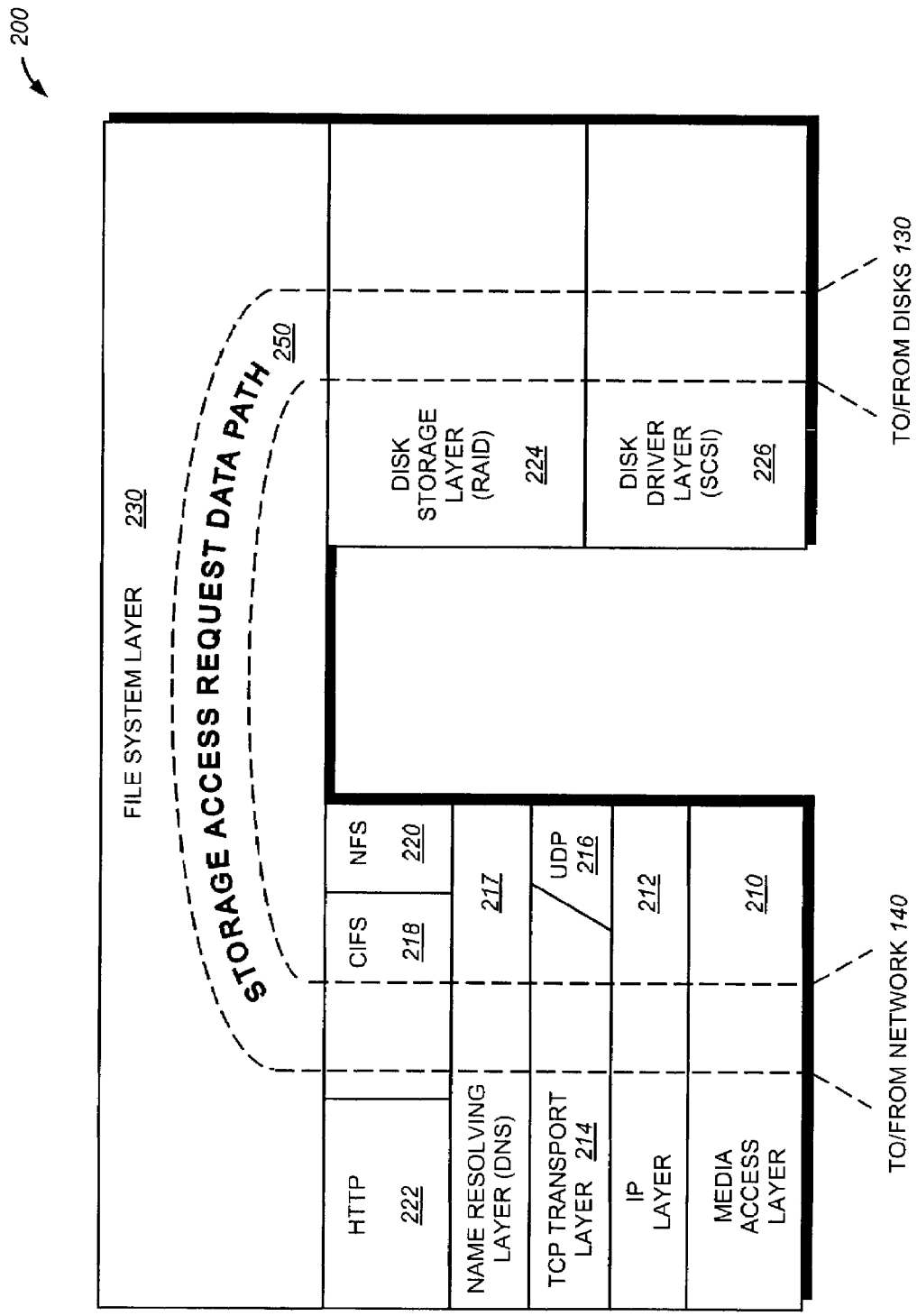
FIG. 2 is a schematic block diagram illustrating an exemplary storage operating system for use with the illustrative file server of FIG. 1.

The organization of a storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 210 of network drivers (e.g., an Ethernet driver). The operating system further includes network communication and protocol layers, such as the Internet Protocol (IP) layer 212 and its supporting transport mechanisms, the Transport Control Protocol (TCP) layer 214 and the User Datagram Protocol (UDP) layer 216. The storage operating system 200 also includes a Name Resolving Layer 217 used for performing name resolutions within a naming service such as DNS, NIS or WINS. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol and a disk driver layer 226 that implements a disk control protocol, such as the small computer system interface (SCSI).

Bridging the disk software layers with the network and file system protocol layers is a file system layer 230 of the storage operating system 200. Generally, the layer 230 implements a file system having an on-disk format representation that is block-based using, e.g., 4-kilobyte (KB) data blocks and using inodes to describe the files. An inode is a data structure used to store information about a file, such as ownership of the file, access permission for the file, size of the file, name of the file, location of the file, etc. In response to file access requests, the file system generates operations to load (retrieve) the requested data from disks 130 if it is not resident "in-core", i.e., in the filer's memory 124. If the information is not in memory, the file system layer 230 indexes into an inode file using an inode number to access an appropriate entry and retrieve a logical volume block number. The file system layer 230 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from disks 130 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126 and 128 may be configured to offload some or all of the packet processing and storage access operations, respectively, from processor 122 to thereby increase the performance of the file service provided by the filer.

C. Naming Services

A naming service matches equivalent network addresses for a client or server in a network, such as the Internet. For instance, a single file server may be identified by multiple network addresses including domain names and IP addresses. Typically, a naming service is implemented by one or more name servers in the network that perform "address to name" and "name to address" resolutions.

File servers often use a naming service, such as the DNS, to authenticate the originator of a received file access request. In many file system protocols, such as CIFS, a communication session is established between a file server and a client, and the client is authenticated at the beginning of the session. That is, when a new session is established, a storage operating system in the file server requests an "address to name" resolution and sends the request to one or more name servers. Subsequently, the name servers return the client's alphanumeric domain name (such as an URL). The filer may then match the received name against an authentication database to decide whether or not the client has requisite permissions to be served. Additionally, the file server may also rely on the naming service for "name to address" resolutions when routing data packets back to a client.

Figure 3:
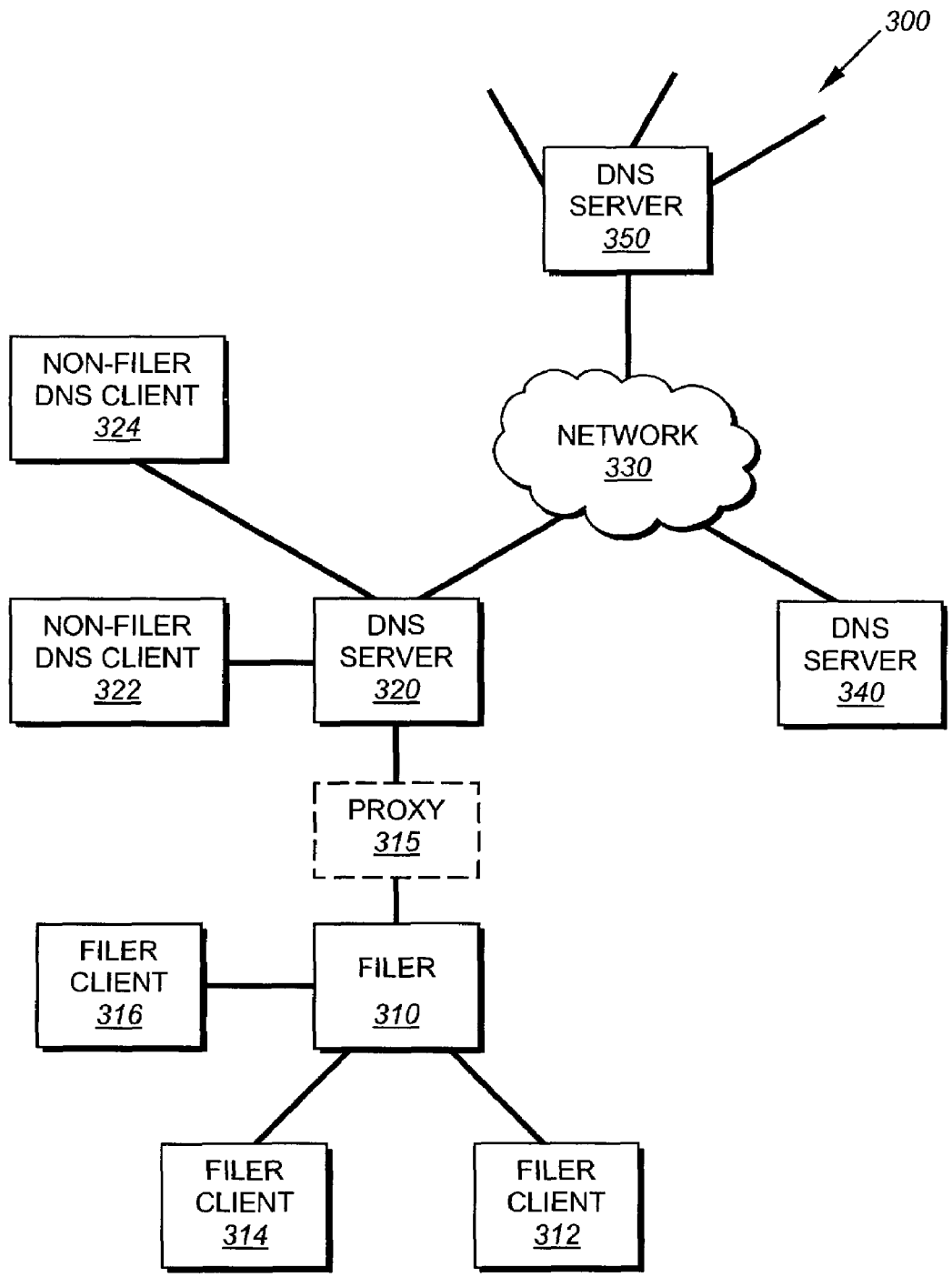
FIG. 3 is a schematic block diagram illustrating an implementation of the Domain Name Service (DNS) including a filer.

FIG. 3 illustrates the Domain Name Service 300 including a filer 310. Although the DNS is shown, it is expressly contemplated other naming services, e.g. NIS and WINS, could similarly be implemented. The filer 310 is connected to clients 312, 314 and 316 over a network using a conventional file system protocol such as NFS or CIFS. When the filer requests a name resolution, it first checks a DNS cache that may reside in a proxy cache server ("proxy") 315 or in its local buffer cache 135. If the filer can not perform the name resolution using mapping information stored in the cache (i.e., "cached mappings"), it forwards the request to a DNS server 320.

DNS server 320 is connected to a plurality of DNS clients, among which are filer 310 (or its proxy 315) and non-filer clients 322 and 324. When the server 320 receives a request for a name resolution it can resolve, e.g. from filer 310, it sends a response back to the requestor. However, if the server can not resolve a received network address, it forwards the request to one or more DNS servers 340 and 350 via a network 330, such as the Internet. The requested name resolution may continue to be forwarded to additional DNS servers until either a response is returned to the requestor (i.e., the filer) or a predetermined amount of time lapses.

Figure 4:
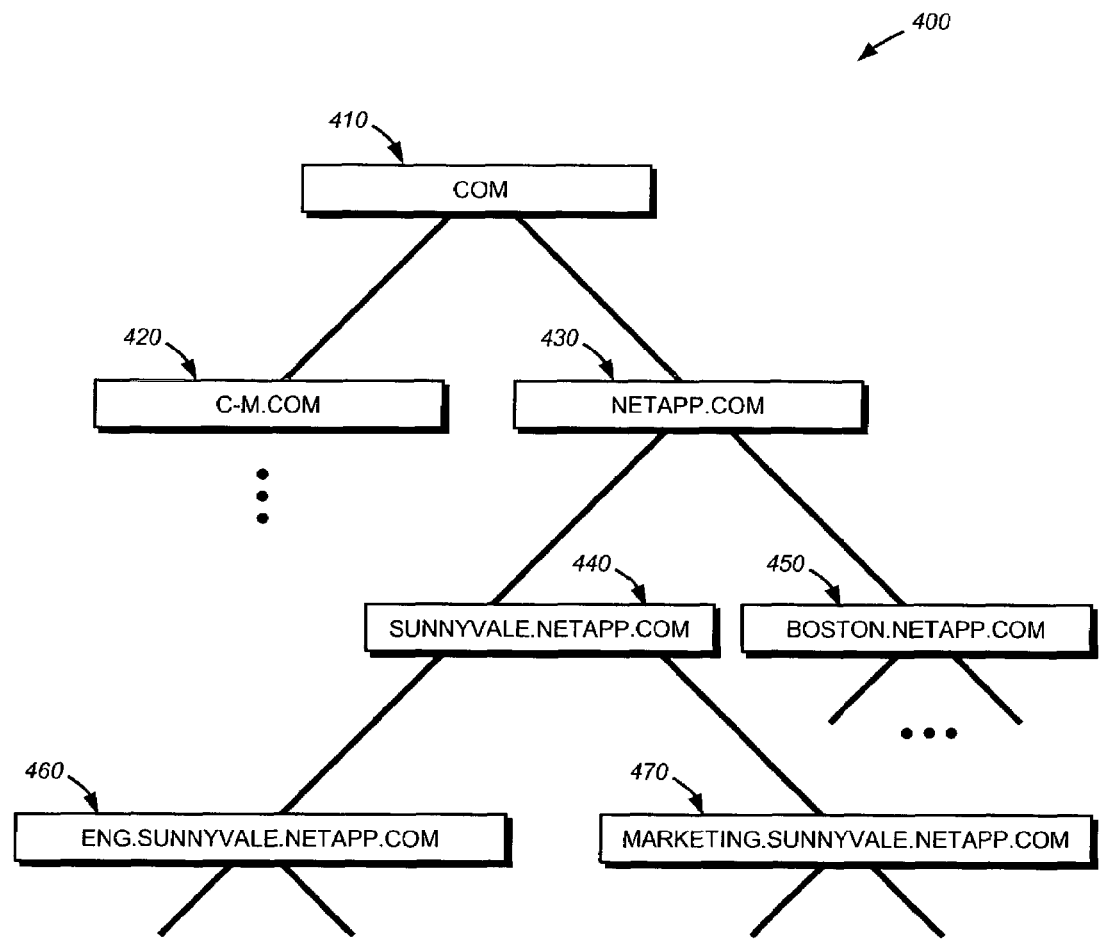
FIG. 4 is a schematic block diagram illustrating an exemplary hierarchical structure of domain name servers within a naming service.

FIG. 4 illustrates the hierarchical structure 400 of domain servers within an exemplary naming service. In this example, a "top-level" (root) server 410 in the ".com" domain couples domain servers 420 and 430 that are respectively used to resolve name resolutions in the "c-m.com" and "netapp.com" domains. Server 430, in turn, couples name servers 440 and 450 in the "sunnyvale.netapp.com" and "boston.netapp.com" subdomains. Similarly, the sunnyvale.netapp.com domain name server couples servers 460 and 470 in the engineering and marketing subdomains.

When a server in a netapp.com subdomain, such as the eng.sunnyvale.netapp.com server 460, receives a request to resolve a name in the c-m.com domain, the request is forwarded through the hierarchical naming service to c-m.com server 420. If necessary, the request is additionally forwarded to subdomain servers in the c-m.com domain. Once a name server receives the request and performs the appropriate name resolution, a response is returned preferably along a reverse path to the server that originated the request. Because redundancy is often designed into a naming service, there are often multiple paths to and from different domain name servers in a naming service. Therefore, the return path of the response to the originating server may be different than the forward path of the request depending on the dynamics of the network, i.e. network traffic, dead servers, power outages, etc.

D. Name Resolutions When Name Servers are Dead

Figure 5:
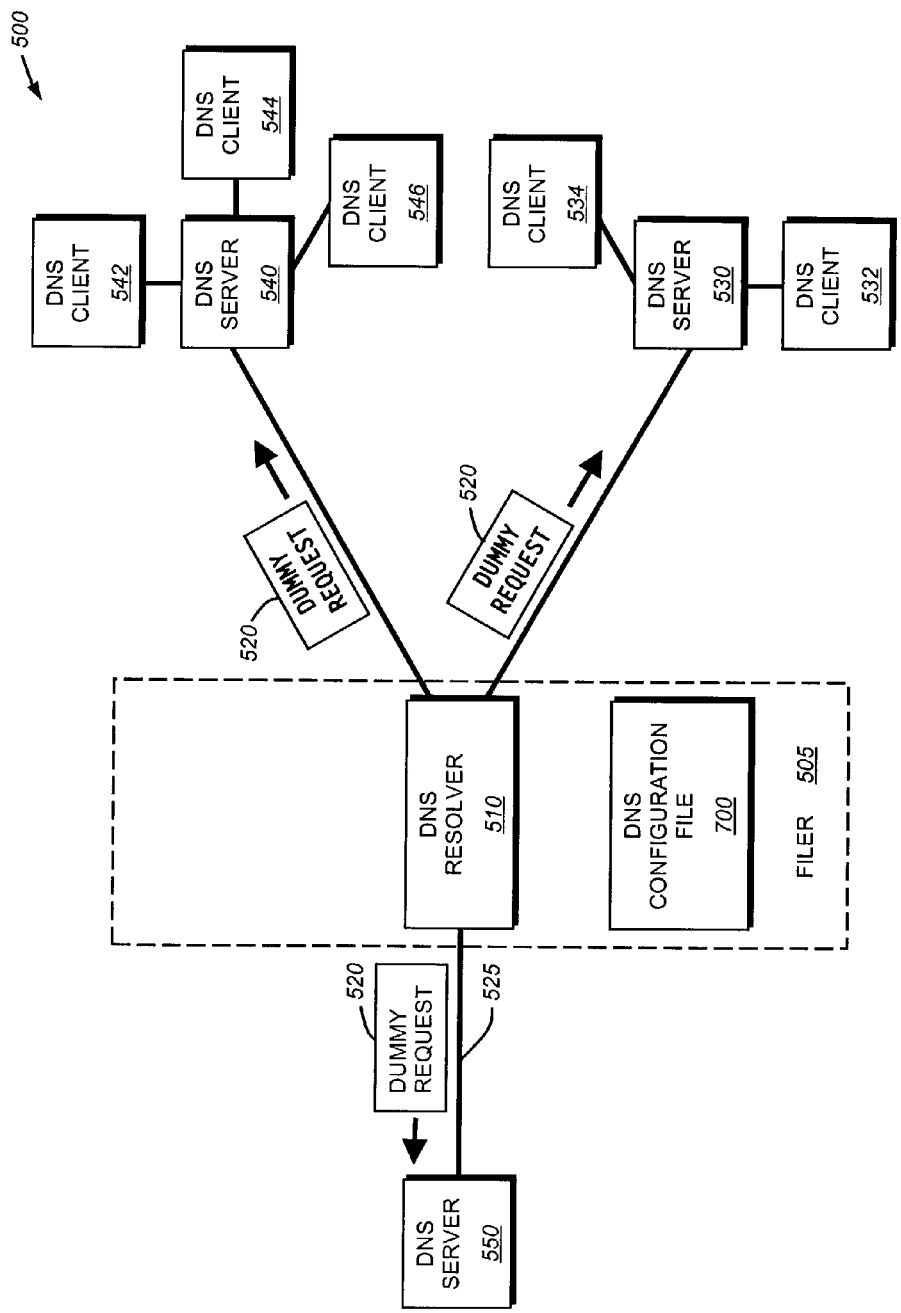
FIG. 5 is a schematic block diagram illustrating a DNS resolver of the present invention sending dummy packets to domain servers to determine if they are "alive" or "dead;"

FIG. 5 illustrates a system 500 of the present invention including a DNS resolver in a filer that sends "dummy" requests to known name servers. As used herein, a dummy request is a request used to test the responsiveness of a server and does not necessarily include a network address to be resolved. Thus, the resolver waits a predetermined amount of time for responses to the dummy requests then determines which known DNS servers are "alive" and "dead." A dead server is understood as being inaccessible to clients attempting to access its services. The dead/alive status for each known server is updated in the resolver's DNS configuration file that may also be stored in the filer.

As shown, filer 505 comprises DNS resolver code 510 that sends dummy requests 520 to DNS servers 530, 540 and 550. The filer further comprises DNS configuration file 700 that stores the dead/alive status for each of the servers to which the dummy requests 520 were sent. The servers are connected to the filer over a computer network 525, such as a point-to-point link, shared local area network (LAN), wide area network (WAN), or virtual private network (VPN) implemented over a public network. Each DNS server may be connected to additional DNS clients besides filer 510, such as clients 532, 534, 542, 544 and 546.

Figure 6:
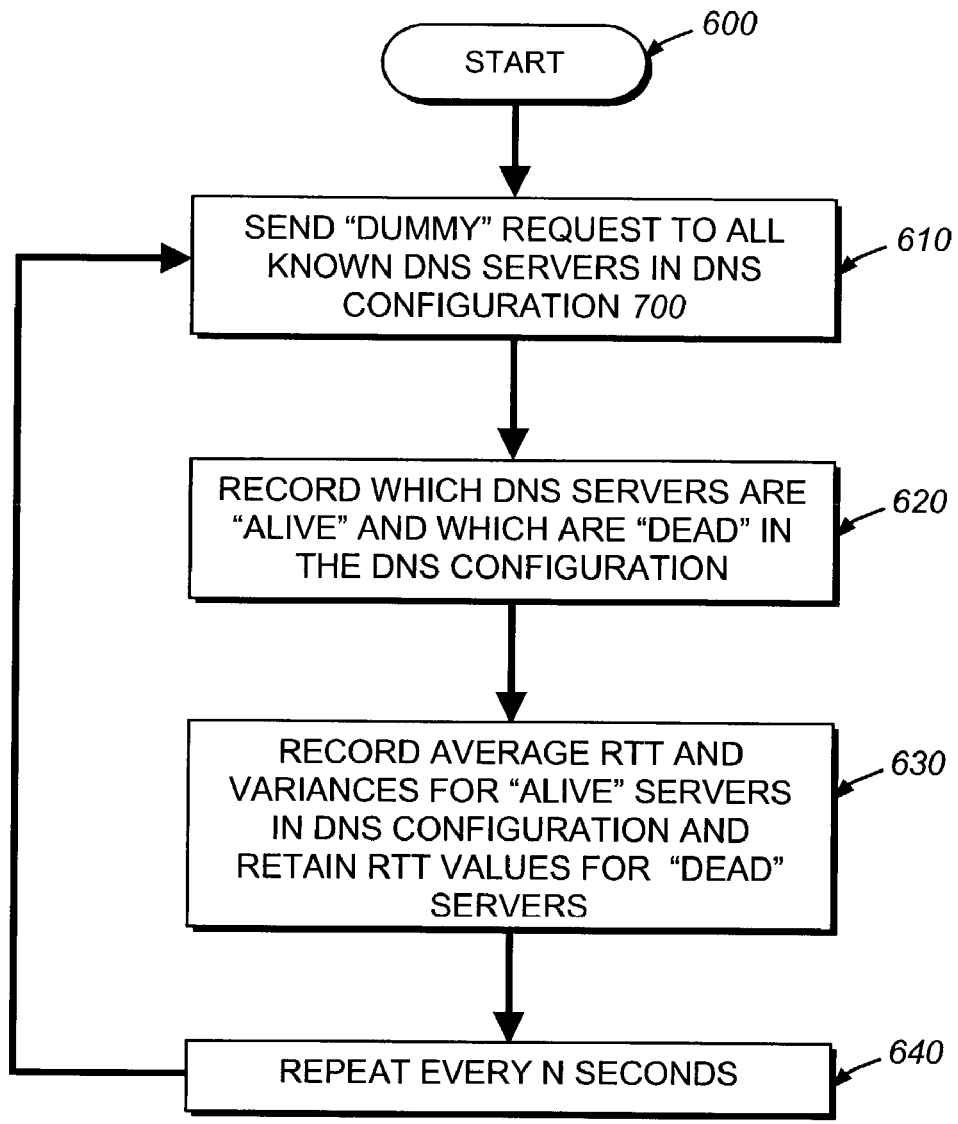
FIG. 6 is a flowchart illustrating the corresponding method for a DNS resolver in FIG. 5 to determine whether DNS servers are "alive" or "dead;"

FIG. 6 is a flowchart illustrating a sequence of steps performed by DNS resolver 510 when determining whether DNS servers are "alive" or "dead." The sequence starts at step 600 and proceeds to step 610 where the resolver sends a dummy request in parallel to all known DNS servers listed in its DNS configuration file 700. Next, at step 620, the resolver waits a predetermined amount of time before determining whether any of the DNS servers responded to the dummy request. For each server in the DNS configuration, the resolver marks the server as "alive" if it responded to the dummy request or "dead" if it did not respond. The dead/alive status for each server can be stored in the DNS configuration as a binary flag, an alphanumeric name, or in an equivalent manner known in the art.

At step 630, the resolver code measures a "round-trip time" (RTT) for each alive DNS server, then updates an average and variance RTT value for each "alive" server in the DNS configuration. Thus, RTT times and/or their related statistics may indicate a measure of a server's "responsiveness." The round-trip time is computed as the time elapsed from when the resolver sent the dummy request until the time it received a response. For those servers that do not respond, i.e. are "dead," the resolver code 510 does not update their average and variance RTT value in the DNS configuration, but instead retains RTT values from the previously responsive "dead" servers. The resolver code repeats this polling process every N seconds, at step 640, and constantly updates the DNS configuration to record which name servers are accessible. i.e. are "alive," along with their respective average and variance RTT values. Those skilled in the art will understand the polling period, N, can be set to any arbitrary value.

FIG. 7 is a portion of an exemplary DNS configuration that may be used by a resolver of the present invention. DNS configuration 700 includes the domain 710 in which the resolver is located, e.g. "eng.netapp.com." The configuration additionally includes a list of known name servers 720, 730, 740 and 750 listed in a predetermined order, e.g. with the first name server at the top of the ordered list (i.e., server 720). For each known domain name server, the DNS configuration associates a leading identifier, network address(es), a "dead" or "alive" status, an average RTT and a RTT variance. For example, name server 720 has leading identifier "NAMESERVER," a network address 10.1.1.4, a dead/alive status of "DEAD," an average RTT of 7.4 and a RTT variance of 1.2 (the RTT values may be recorded using arbitrary units). It will be understood by those skilled in the art that the DNS configuration may store other statistics, such as the probability a server is dead, as well as other identifying information for each server.

In contrast to conventional resolver implementations, an enhanced resolver of the present invention does not have to sequentially contact servers listed in its DNS configuration that are determined to be inaccessible, i.e. "dead." Because its DNS configuration records the dead/alive status for known name servers, the resolver can assure it will attempt to contact at least one accessible, i.e. "alive," name server when one exists. In the case where all servers are inaccessible, the resolver can attempt to resolve requests using its DNS cache (not shown) until at least one name server responds to one of the periodic dummy requests (see FIG. 6).

Figure 8:
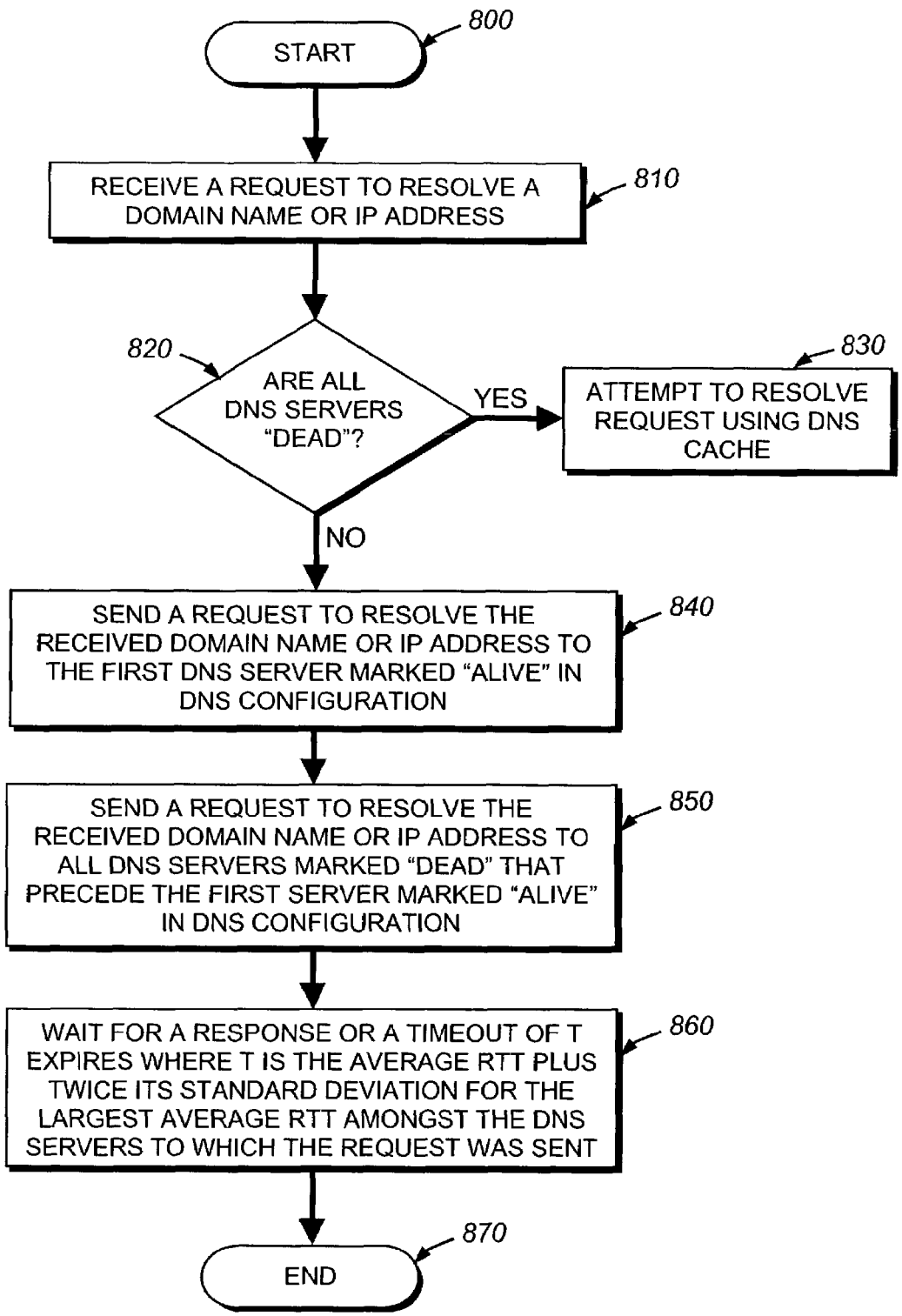
FIG. 8 is a flowchart illustrating a method for performing name resolutions according to the invention.

FIG. 8 illustrates a sequence of steps implemented by a resolver when performing name resolutions, according to the invention, where one or more DNS servers are "dead." The sequence starts at step 800 and proceeds to step 810 where a resolver receives a request to resolve a domain name or IP address. The request may originate from, inter alia, a storage operating system authenticating a client or a storage operating system routing data packets to a client. At step 820, the resolver checks its DNS configuration to determine whether all known name servers are "dead." If there are no accessible DNS servers, the resolver attempts to resolve the request using its DNS cache at step 830. The DNS cache may be implemented locally or in an associated proxy.

At step 840, if the DNS configuration indicates at least one server is accessible, the resolver sends a request to resolve the received domain name or IP address to the first "alive" server listed in the configuration. Next, at step 850, the resolver additionally sends parallel requests to resolve the received domain name or IP address to each "dead" server that precedes the first "alive" server in the DNS configuration order. At step 860, the resolver waits to receive a response or until a timeout T expires. Although it is envisioned T is any predetermined value, in the illustrative embodiment of FIG. 8, the timeout period is computed as the average RTT plus twice its standard deviation (i.e., the positive square root of the RTT variance) for the largest average RTT amongst the DNS servers to which the request was sent. The sequence ends at step 870.

E. Non Fully-qualified Name Resolutions

Figure 9:
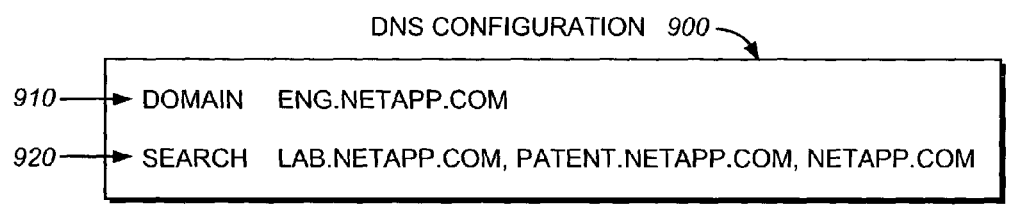
FIG. 9 is a schematic block diagram illustrating a portion of an exemplary DNS configuration.

FIG. 9 illustrates a portion of an exemplary DNS configuration 900. The configuration comprises the domain 910 in which an associated resolver is located, e.g. "eng.netapp. com," and an ordered list of suffixes 920 ("trailing substrings") that are appended to non fully-qualified name resolutions received by the resolver.

For example, if a resolver receives a request to resolve the non fully-qualified domain name "foo.research," the resolver sequentially appends the suffixes in the DNS configuration until the requested name can be resolved, if at all. For DNS configuration 900, the resolver uses the ordered list of suffixes 920 to sequentially attempt resolving the names foo.research.lab.netapp.com, foo.research.patent.netapp.com and foo.research.netapp.com.

Figure 10:
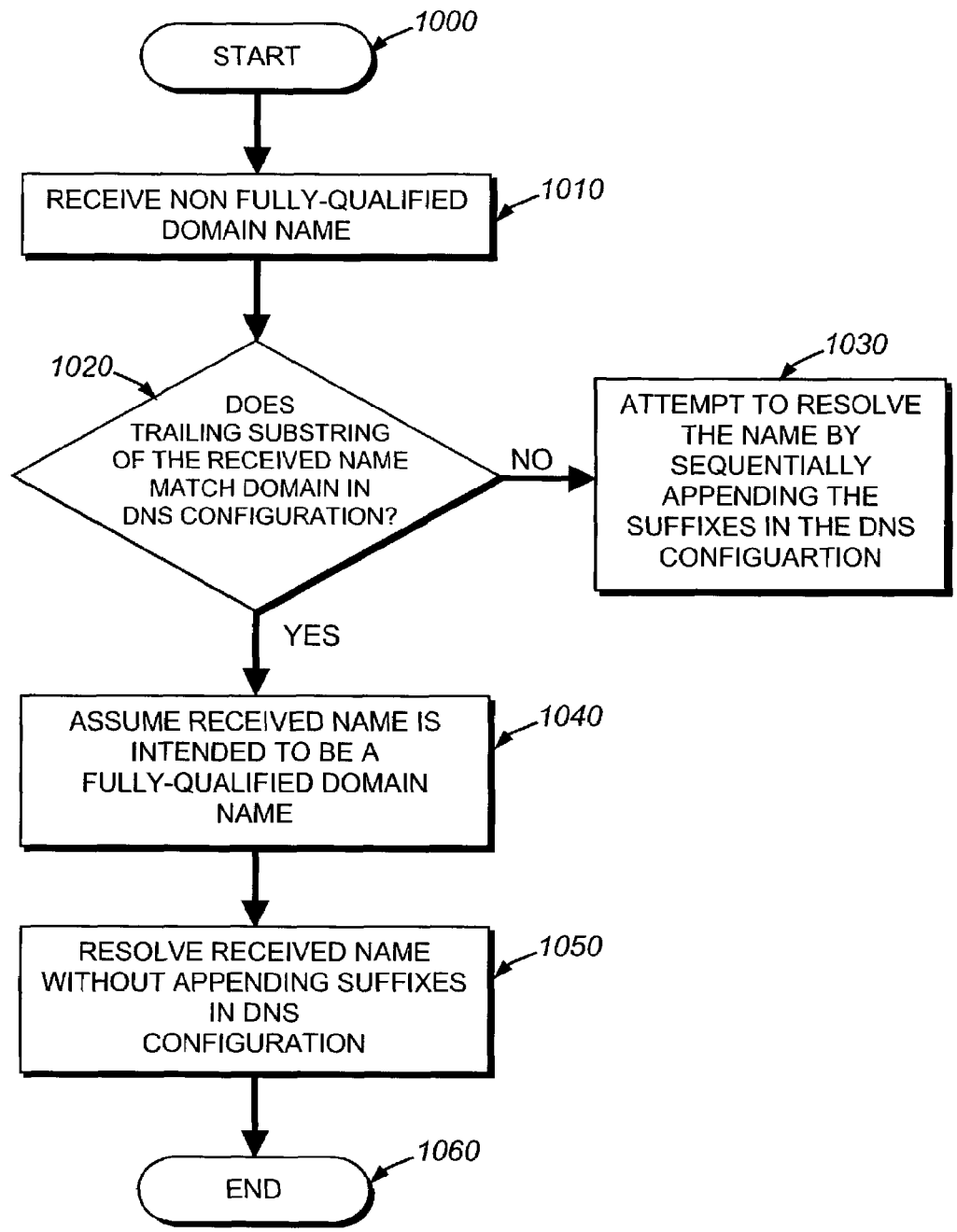
FIG. 10 is a flowchart illustrating a method for resolving a non fully-qualified network address that matches the domain in a DNS configuration of the present invention.

However, often a resolver receives a non-fully qualified name intended to be a fully-qualified name but missing the trailing "." designating it as such. FIG. 10 is a flow-chart illustrating a sequence of steps for identifying and resolving non fully-qualified names intended to be fully-qualified. The sequence starts at step 1000 and proceeds to step 1010 where a resolver receives a non fully-qualified domain name. Resolution of the received domain name may be requested by the storage operating system of a filer for routing data packets. At step 1020, the resolver determines whether the received name has a trailing substring that matches the domain enumerated in its DNS configuration.

When the received domain name does not have a trailing substring that matches the domain of the resolver, at step 1030, the resolver attempts to resolve the name by sequentially appending the trailing suffixes listed in the DNS configuration. However, when the received domain name has a trailing substring that matches the domain of the resolver, the name is assumed to be fully-qualified, at step 1040. Consequently, the resolver attempts to resolve the name without appending suffixes listed in the DNS configuration, at step 1050. The sequence ends at step 1060.

F. "Known Bad Trailers" and "Known Partially Good Trailers"

Conventional DNS resolver architectures generally do not record which name servers can and cannot resolve a particular network address. Thus, a conventional resolver may repeatedly contact a server to resolve a network address that the same server previously could not resolve. A server may not be able to resolve a network address for any number of reasons, such as when it is dead, overloaded or not properly configured.

Figure 11:
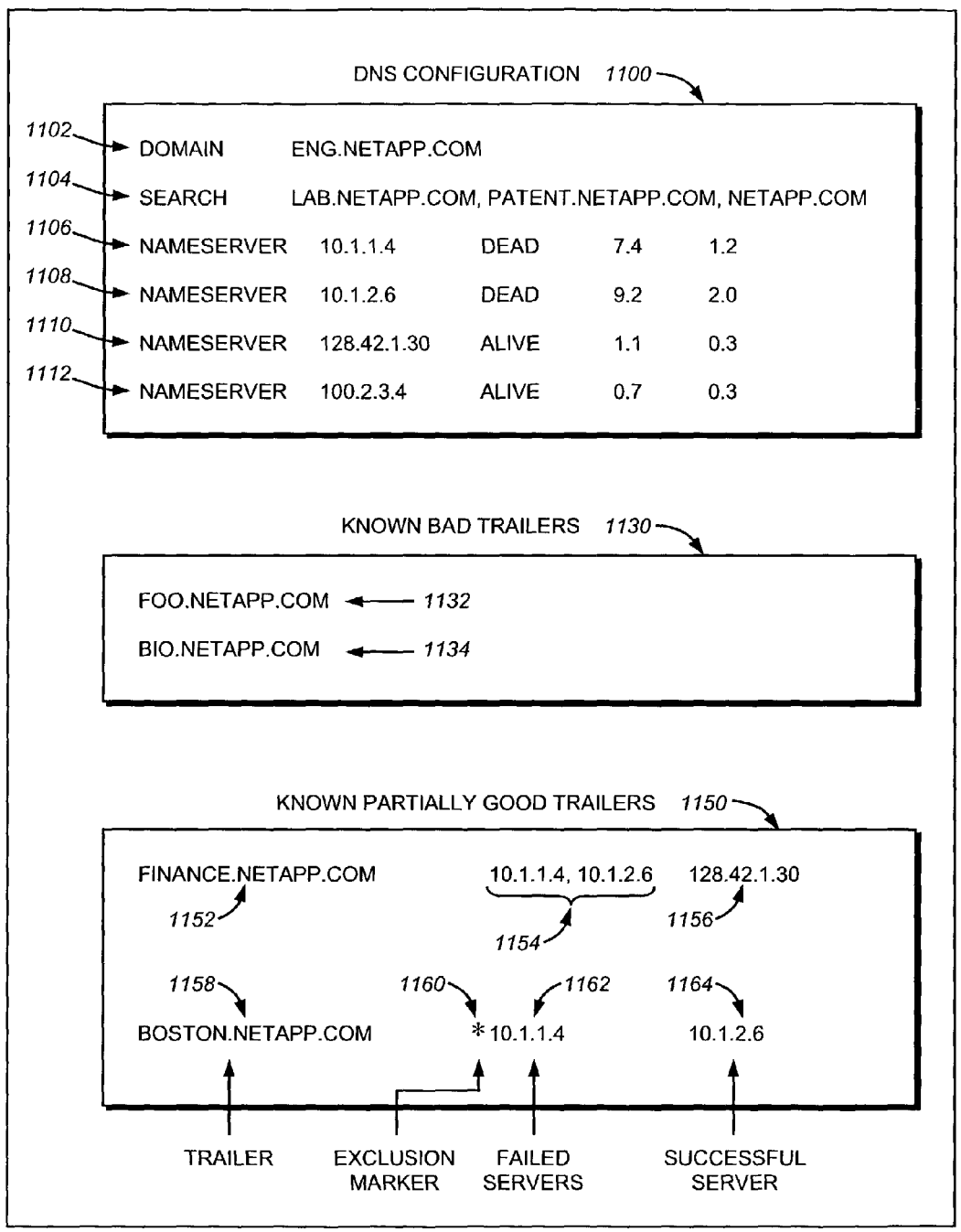
FIG. 11 is a schematic block diagram illustrating an exemplary DNS configuration according to the invention and corresponding lists of "known bad trailers" and "known partially good trailers.

According to the invention, a table configured to store "known bad trailers" allows a resolver to bypass name resolutions that previously could not be resolved by any known name servers. Further, the invention includes a table of "known partially good trailers" that allows a resolver to initially contact a server that previously succeeded to resolve a desired name resolution. FIG. 11 illustrates an exemplary DNS configuration 1100 and its associated tables of "known bad trailers" 1130 and "known partially good trailers" 1150. Although depicted separately in FIG. 11, tables 1130 and 1150 could be included as part of DNS configuration 1100.

The DNS configuration 1100 comprises the domain 1102 in which the resolver is located, e.g. "eng.netapp.com," an ordered list of suffixes 1104 ("trailing substrings") that are appended to non fully-qualified name resolutions and a list of known name servers 1106, 1108, 1110 and 1112 listed in a predetermined order, e.g. with the first name server at the top of the ordered list (i.e., server 1106). For each known domain name server, the DNS configuration associates a leading identifier, network address(es), a "dead" or "alive" status, an average RTT and a RTT variance. For example, name server 1106 has leading identifier "NAMESERVER," a network address 10.1.1.4, a dead/alive status of "DEAD," an average RTT of 7.4 and a RTT variance of 1.2 (the RTT values may be recorded using arbitrary units). The DNS configuration may store other statistics, such as the probability a server is dead, as well as other identifying information for each server.

Advantageously, DNS configuration 1100 is associated with a table of "known bad trailers" 1130. The "known bad trailer" table includes suffixes that previously failed to be resolved by all known DNS servers. For example, "foo.netapp.com" 1132 and "bio.netapp.com" 1134 could not be resolved by any name server in DNS configuration 1100. Therefore, when a resolver receives a request to perform a name resolution, it first matches trailing substrings of the received request to those listed in the table of "known bad trailers." If there is a match, then the resolver determines the request is for a bad network address and consequently does not attempt to resolve it.

After a predetermined time or a predetermined number of name resolutions, the resolver in the present invention may revalidate the "badness" of a trailer in table 1130 by sending a resolution request for the trailer to all known DNS servers in parallel. When the resolver determines the suffix can be resolved, the suffix is removed from the table of "known bad trailers." By periodically testing entries in the table of "known bad trailers," the contents of the table remain up-to-date. Individual entries in the table of "known bad trailers" can be revalidated at the same time or each at a different time.

DNS configuration 1100 is also associated with "known partially good trailers" table 1150. The "known partially good trailer" table includes suffixes that previously failed to be resolved by at least one name server before eventually being resolved. For each trailer in table 1150, a list of servers that failed to resolve the trailer is stored in addition to the server that succeeded. For example, "finance.netapp.com" 1152 previously could not be resolved by DNS servers 1154 (10.1.1.4 and 10.1.2.6) before being resolved by server 1156 (128.42.1.30). Therefore, when a resolver receives a request to perform a name resolution (e.g. "foo.finance.netapp.com"), it matches trailing substrings of the received request to those listed in the table of "known partially good trailers." If there is a match (e.g., "finance.netapp.com"), then the resolver sends the name resolution request to the last server that succeeded to resolve the name (e.g., server 1156) in parallel with resolution requests to all the servers that previously failed to resolve the name (e.g., servers 1154). Periodically, e.g. after a predetermined number of seconds or resolutions, the resolver can invalidate entries in the table of "known partially good trailers" and assume the trailers are "good" once again.

If a name server fails to resolve a particular suffix in the "known partially good trailers" table 1150 more than once, the server is marked to be excluded from the next resolution of a network address having this suffix. For example, the asterisk 1160 indicates server 1162 (10.1.1.4) previously failed to resolve the suffix "boston.netapp.com" 1158 more than once and should be excluded from future name resolutions having this suffix. On the other hand, the resolver contacts name server 1164 (10.1.2.6) since table 1150 indicates the server previously succeeded to resolve the suffix "boston.netapp.com." Instead of using asterisk 1160 as a marker, server 1162 could be marked with an equivalent flag or removed altogether. Furthermore, although a server is marked to be excluded from future name resolutions if it fails more than once, it is expressly contemplated that a server can be marked to be excluded if it fails any predetermined number of times.

Figure 12:
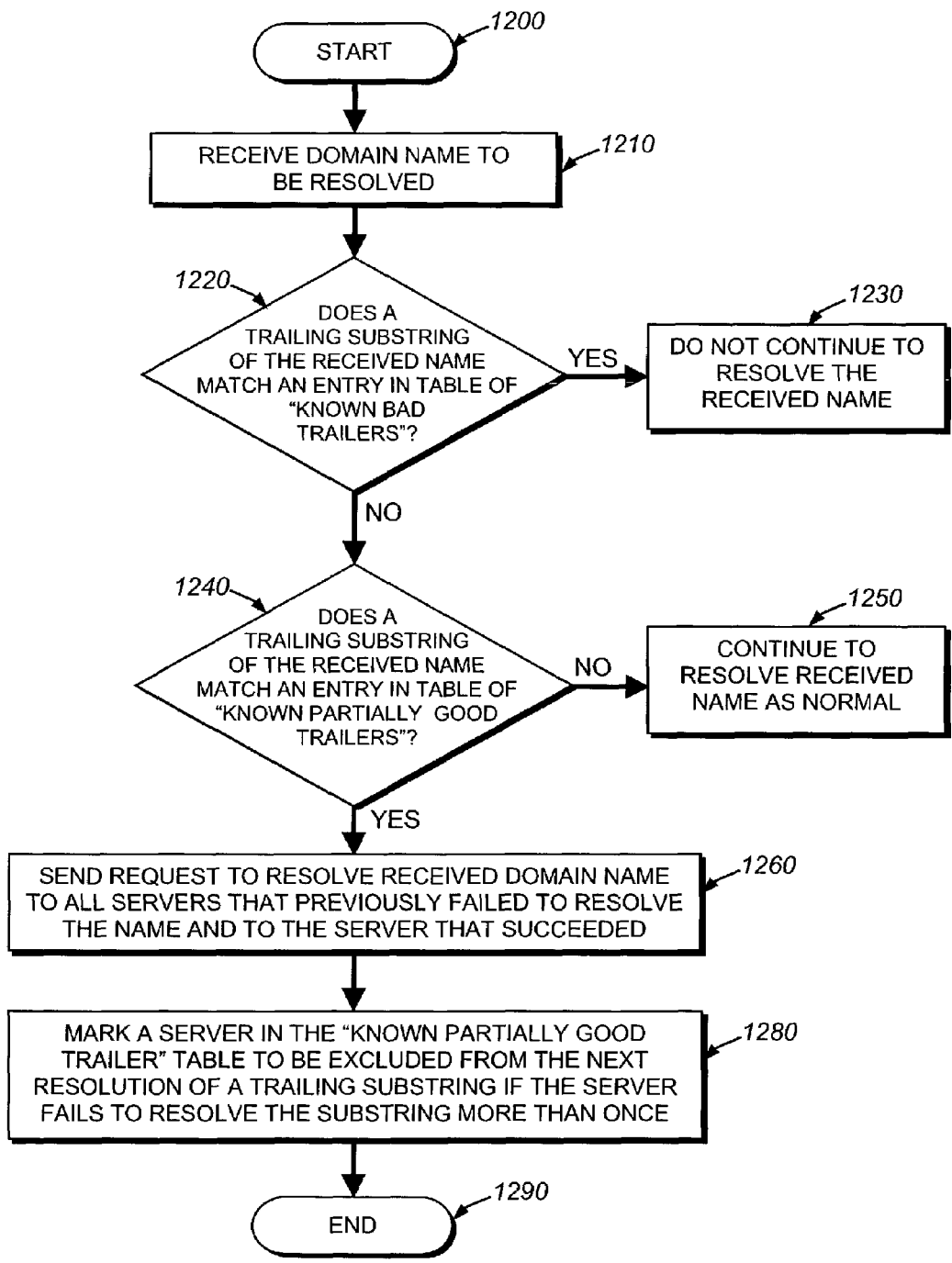
" and FIG. 12 is a flowchart illustrating a method for resolving a domain name according to the present invention.

FIG. 12 is a flowchart illustrating a sequence of steps for resolving a domain name according to the present invention. Although the method depicted contemplates a domain name resolution, it similarly can be applied to resolve any network address, e.g. an IP address. The sequence starts at step 1200 and proceeds to step 1210 where a resolver receives a domain name to be resolved. The request may originate from, inter alia, a storage operating system authenticating a client or a storage operating system routing data packets to a client. At step 1220, trailing substrings of the domain name are compared with entries in a table of "known bad trailers." If there is a match, at step 1230, then the resolver does not continue to resolve the received name.

Otherwise, at step 1240, the resolver compares trailing substrings of the received name to entries in a table of "known partially good trailers." If suffixes of the received name do not match any entries in the table of "known partially good trailers," then the resolver continues to resolve the received name as "normal" at step 1250. Thus, at step 1250, the received name can be resolved as set forth by the method in FIG. 8, and, when appropriate, the resolver adds to the tables of "known bad trailers" and "known partially good trailers" based on the results of the name resolution. At step 1260, when a trailing substring of the received domain name matches an entry in the table of "known partially good trailers," the resolver sends a request to resolve the domain name to all servers that previously failed to resolve the name in parallel with a request to the server that succeeded. Lastly, at step 1280, servers that fail more than once to resolve a substring listed in the "known partially good trailers" table are marked to be excluded from the next name resolution having that substring. The sequence ends at step 1290.

G. Conclusion

It is expressly contemplated that the DNS resolver set forth herein, or elements of the resolver, may be adapted for use in other systems that manage or implement DNS services. For example, a DNS diagnosis or debugging tool may rely on the contents of the illustrative DNS configuration to determine the responsiveness (e.g., RTT times) and dead/alive status of DNS servers. Similarly, the diagnosis tool may rely on the contents of one or more of the tables and configurations of the present invention to identify inefficiencies in resolving DNS suffixes. That is, the tool may determine a DNS server is misconfigured for one or more suffixes or a DNS client's configuration should add or delete one or more DNS servers to more efficiently resolve suffixes. For instance, by examining the contents of a client's table of "known partially good trailers" and DNS configuration, the diagnostic/debugging tool may determine that the client's resolver contacts servers having relatively large RTT times, e.g., due to indirect look-ups, when resolving one or more suffixes. In this case, the tool may be configured to add more servers to the client's configuration to more efficiently resolve these suffixes.

The diagnosis/debugging tool may also store the contents (or portions thereof) of any of the tables and/or configurations described herein to generate one or more reports. The reports may include RTT times, known bad trailers, servers' dead/alive status, etc., that are stored at predetermined times in a resolver's configuration and associated tables. For example, the tool may generate a new time-stamped and/or date-stamped report, e.g., every hour. Alternatively, the resolver or another application, e.g., in the client system, may be configured to periodically generate and store the reports. The diagnosis/debugging tool may therefore analyze the contents of a set of stored reports to extract information regarding the DNS that could not otherwise be identified. It is contemplated that the diagnosis/debugging tool may be incorporated into the resolver code, or vice-versa. Those skilled in the art will appreciate that mechanisms of the present invention may also be adapted for use in other network tools besides those that perform diagnosis and/or debugging.

The foregoing has been a detailed description of an illustrative embodiment of the invention. Various modifications and additions can be made without departing from the spirit and scope of the invention. For example, although the DNS is the naming service shown in illustrative embodiments of the invention, other naming services, such as WINS and NIS, could also be implemented. Furthermore, information according to the invention that is stored in a DNS configuration, such as average and variance RTT values, dead/alive server status, etc., could equivalently be stored outside the configuration at a location available to the resolver code. Additionally, parallel queries to name servers could be made sequentially without departing from the inventive concepts set forth herein.

While this description has been written in reference to filers and file servers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for a computer implemented resolver to perform name resolutions, comprising the steps:
    maintaining a domain name configuration list, the domain name configuration list indicating a domain name order, the domain name order indicating an order in which domain name servers are contacted by the resolver, and the domain name list keeping a record of whether a domain name server of the plurality of known domain name servers is accessible or inaccessible;
    receiving a first request to resolve a network address;
    sending a second request to resolve the network address to a first accessible domain name server in the domain name order, and sending the same second request to at least one inaccessible domain name server appearing in the domain name order before the first accessible domain name server in order to determine if the at least one inaccessible domain name server has become accessible since the domain name list was prepared.

2. The method as in claim 1, further comprising:
    sending the second request to the inaccessible domain name server in parallel with sending the second request to the first accessible domain name server.

3. The method as in claim 1, further comprising:
    sending the second request to the inaccessible domain name server without waiting for a response to the second request to the first accessible domain name server.

4. The method as in claim 1, wherein maintaining the domain name configuration list further comprises:
    contacting a plurality of name servers;
    recording, in the domain name configuration list, which of the name servers are accessible as accessible servers and which are inaccessible as inaccessible servers; and
    periodically repeating steps (a) and (b) in order to update the configuration.

5. The method as in claim 4, further comprising:
    in the event that all known domain name servers are inaccessible, periodically contacting the known domain name servers in parallel to see if any has become accessible again.

6. The method as in claim 1, further comprising:
    sending the same second request in parallel to a plurality of inaccessible domain name servers appearing in the domain name order before the first accessible domain name server.

7. A computer-readable media having instructions for execution in a processor for the practice of a method, the method comprising the steps of:
    maintaining a domain name configuration list, the domain name configuration list indicating a domain name order, the domain name order indicating an order in which domain name servers are contacted by the resolver, and the domain name list keeping a record of whether a domain name server of the plurality of known domain name servers is accessible or inaccessible;
    receiving a first request to resolve a network address;
    sending a second request to resolve the network address to a first accessible domain name server in the domain name order, and sending the same second request to at least one inaccessible domain name server appearing in the domain name order before the first accessible domain name server in order to determine if the at least one inaccessible domain name server has become accessible since the domain name list was prepared.

8. A domain name resolver comprising:
    a domain name configuration list including an ordered list of suffixes for appending to non fully-qualified name resolutions;
    a table of known bad trailers associated with the configuration list, the table of known bad trailers including suffixes that previously failed to be resolved by all known domain name servers; and
    a table of known partially good trailers associated with the configuration list, the table of known partially good trailers including suffixes that previously failed to be resolved by at least one domain name server before eventually being resolved, the suffixes which previously failed to be resolved by all known domain name servers and the suffixes which previously failed by to be resolved by at least one name server to be sent to at least one domain name server to determine if the suffixes have become resolvable since they failed to be resolved.

9. The domain name resolver of claim 8, wherein the domain name configuration list further includes:

a domain in which the resolver is located;

an ordered list of network addresses for known name servers;

a dead or alive indication for each of the known name servers.

10. The domain name resolver of claim 9, wherein the domain name configuration list further includes:

an average round trip time value for each of the known name server; and a round trip time variance for each of the known name servers.

11. The domain name resolver of claim 8 wherein the resolver is implemented on a storage operating system.

12. The domain name resolver of claim 11 wherein the storage operating system is implemented on a file server.

13. A method for a computer implemented resolver to perform name resolutions, comprising:

maintaining a domain name configuration list, the domain name configuration list keeping a record of whether a domain name server of a plurality of known domain name servers is accessible or inaccessible;

receiving a first request to resolve a network address;

sending a second request to resolve the network address to a first accessible domain name server, and sending the same second request to at least one inaccessible domain name server;

receiving a name resolution from the inaccessible domain name server; and updating the domain configuration list to indicate that the inaccessible domain name server is changed to the status of accessible.

14. A computer readable media, comprising:

said computer readable media containing instructions for execution on a processor for the practice of a method for a computer implemented resolver to perform name resolutions, the method having the steps of:

maintaining a domain name configuration list, the domain name configuration list keeping a record of whether a domain name server of a plurality of known domain name servers is accessible or inaccessible;

receiving a first request to resolve a network address;

sending a second request to resolve the network address to a first accessible domain name server, and sending the same second request to at least one inaccessible domain name server;

receiving a name resolution from the inaccessible domain name server; and updating the domain configuration list to indicate that the inaccessible domain name server is changed to the status of accessible.

15. A domain name resolver comprising:

a domain name configuration list, the domain name configuration list keeping a record of whether a domain name server of a plurality of known domain name servers is accessible or inaccessible;

a network adapter to receive a first request to resolve a network address;

an operating system to send a second request to resolve the network address to an accessible domain name server, and to send the same second request to at least one inaccessible domain name server; and a processor to receive a name resolution from the inaccessible domain name server, and the processor to update the domain configuration list to indicate that the inaccessible domain name server is changed to the status of accessible.

* * * * *